United States Patent
Lane

(10) Patent No.: US 12,312,227 B2
(45) Date of Patent: May 27, 2025

(54) METHOD OF INVERTING CONTAINER BASE PRIOR TO COOLING

(71) Applicant: AMCOR RIGID PACKAGING USA, LLC, Ann Arbor, MI (US)

(72) Inventor: Michael T. Lane, Brooklyn, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 77 days.

(21) Appl. No.: 16/646,728

(22) PCT Filed: Sep. 21, 2017

(86) PCT No.: PCT/US2017/052727
§ 371 (c)(1),
(2) Date: Mar. 12, 2020

(87) PCT Pub. No.: WO2019/059912
PCT Pub. Date: Mar. 28, 2019

(65) Prior Publication Data
US 2020/0270109 A1    Aug. 27, 2020

(51) Int. Cl.
*B67C 3/22* (2006.01)
*B29C 49/42* (2006.01)
(Continued)

(52) U.S. Cl.
CPC ............ *B67C 3/22* (2013.01); *B29C 49/4273* (2013.01); *B65B 7/28* (2013.01); *B65B 61/00* (2013.01);
(Continued)

(58) Field of Classification Search
CPC . B29C 49/4802; B29C 49/482; B29C 49/541; B29C 49/06; B29C 49/22;
(Continued)

(56) References Cited

U.S. PATENT DOCUMENTS 3,873,264 A * 3/1975 Daugherty ............ B65C 9/0015
432/18
4,036,926 A * 7/1977 Chang .................. B29C 49/541
264/296

(Continued)

FOREIGN PATENT DOCUMENTS

AU    2011100495 A4    11/2011
CA    3076584 A1    3/2019
(Continued)

OTHER PUBLICATIONS

International Search Report and Written Opinion issued in PCT/US2017/052727, mailed Mar. 6, 2018; ISA/KR.
(Continued)

*Primary Examiner* — Joshua G Kotis
*Assistant Examiner* — Scott A Howell
(74) *Attorney, Agent, or Firm* — Harness, Dickey & Pierce, P.L.C.

(57) ABSTRACT

A method for hot-filling a polymeric container with heated product. The method includes mechanically inverting a base of the polymeric container prior to the heated product cooling in order to create a positive pressure within the container prior to cooling, and a vacuum in the container after cooling.

15 Claims, 7 Drawing Sheets

(51) Int. Cl.
*B29L 31/00* (2006.01)
*B65B 7/28* (2006.01)
*B65B 61/00* (2006.01)
*B65D 23/10* (2006.01)
*B65D 79/00* (2006.01)
*B67C 3/04* (2006.01)

(52) U.S. Cl.
CPC .......... *B65D 79/0081* (2020.05); *B67C 3/045* (2013.01); *B29L 2031/7158* (2013.01); *B65B 2220/24* (2013.01); *B65D 23/102* (2013.01); *B67C 2003/226* (2013.01)

(58) Field of Classification Search
CPC .... B29C 2049/4807; B29C 2049/4889; B29C 2049/4892; B65D 1/0276; B29B 2911/1402; B29B 2911/14026; B29B 2911/14033; B29B 2911/1404; B29B 2911/14106; B29B 2911/14133; B29K 2023/0633; B29K 2023/065; B29K 2023/086; B29K 2067/00; B29K 2077/00; B29K 2105/26; B29K 2995/0067; B29L 2031/7158
See application file for complete search history.

(56) References Cited

U.S. PATENT DOCUMENTS

| | | | | | |
|---|---|---|---|---|---|
| 4,318,882 | A * | 3/1982 | Agrawal | ............. | B65D 1/0223 264/521 |
| 4,342,398 | A * | 8/1982 | Chang | ................ | B65D 1/0276 D24/197 |
| 5,011,648 | A * | 4/1991 | Garver | .................. | B29C 49/64 264/521 |
| 5,090,180 | A * | 2/1992 | Sorensen | ............. | B29C 51/426 53/329.3 |
| 5,122,327 | A * | 6/1992 | Spina | ...................... | B29C 49/30 215/381 |
| 5,492,467 | A * | 2/1996 | Hume | .................... | B29C 45/27 264/328.15 |
| 5,593,056 | A | 1/1997 | Mero et al. | | |
| 5,895,587 | A | 4/1999 | Sorensen | | |
| 5,908,128 | A * | 6/1999 | Krishnakumar | ..... | B65D 1/0223 215/381 |
| 6,942,116 | B2 * | 9/2005 | Lisch | .................. | B65D 1/0276 215/373 |
| 8,313,686 | B2 * | 11/2012 | Beuerle | ............. | B29C 49/4815 264/534 |
| 11,123,914 | B2 * | 9/2021 | Protais | .................. | B29C 49/48 |
| 2003/0161980 | A1 | 8/2003 | Nelson | | |
| 2004/0232103 | A1 * | 11/2004 | Lisch | .................. | B65D 1/0276 215/374 |
| 2005/0249904 | A1 * | 11/2005 | Batlaw | .................. | C08K 5/005 428/35.7 |
| 2005/0266129 | A1 | 12/2005 | Mir | | |
| 2006/0231985 | A1 * | 10/2006 | Kelley | ................ | B29C 49/4802 264/523 |
| 2007/0125743 | A1 * | 6/2007 | Pritchett, Jr. | ........ | B65D 1/0223 215/379 |
| 2007/0215571 | A1 * | 9/2007 | Trude | ................. | B65D 79/0084 215/373 |
| 2009/0202766 | A1 * | 8/2009 | Beuerle | ................. | B29C 49/541 428/36.9 |
| 2009/0218003 | A1 * | 9/2009 | Miyazaki | .................. | B67C 3/14 141/369 |
| 2012/0061410 | A1 * | 3/2012 | Kamineni | ................ | B65D 1/44 220/721 |
| 2014/0109517 | A1 * | 4/2014 | Melrose | .................... | B65D 1/42 53/440 |
| 2017/0096249 | A1 | 4/2017 | Lane et al. | | |
| 2017/0144817 | A1 | 5/2017 | Godet et al. | | |
| 2017/0267391 | A1 * | 9/2017 | Mast | .................. | B65D 79/0081 |
| 2017/0326780 | A1 * | 11/2017 | Protais | .................... | B29C 49/48 |
| 2019/0039768 | A1 | 2/2019 | Tissmer et al. | | |
| 2019/0382181 | A1 | 12/2019 | Melrose et al. | | |
| 2020/0270109 | A1 * | 8/2020 | Lane | ......................... | B65B 7/28 |

FOREIGN PATENT DOCUMENTS

| | | |
|---|---|---|
| CO | 4520128 A1 | 10/1997 |
| CO | 02066657 | 7/2002 |
| DE | 102016202908 A1 | 8/2017 |
| FR | 2828129 A1 | 2/2003 |
| JP | 2008013186 A | 1/2008 |
| JP | 2008050036 A | 3/2008 |
| WO | 2016083711 A1 | 6/2016 |
| WO | WO-2017099703 A1 | 6/2017 |

OTHER PUBLICATIONS

Supplementary European Search Report issued in corresponding European Patent Application No. 17925843.9 dated Apr. 1, 2021 (8 pages).

Office Action issued in corresponding Canadian Patent Application 3,076,584 dated Jun. 23, 2023.

Office Action issued in corresponding Mexican Patent Application MX/a/2020/003252 dated Dec. 8, 2023.

Colombian Office Action regarding Patent Application No. NC20200004314, dated Aug. 24, 2022.

* cited by examiner

METHOD OF INVERTING CONTAINER BASE PRIOR TO COOLING

CROSS-REFERENCE TO RELATED APPLICATION

This application is a U.S. National Phase Application under 35 U.S.C. 371 of International Application No. PCT/US2017/052727 filed on Sep. 21, 2017, the entire disclosure of which is incorporated herein by reference.

FIELD

The present disclosure relates to a method of hot-filling a polymeric container, which includes mechanically inverting a base of the container subsequent to the container being hot filled with product and prior to the product cooling to create a positive pressure in the container during conveying and handling during cooling.

BACKGROUND

This section provides background information related to the present disclosure, which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where ρ is the density of the PET material; ρa is the density of pure amorphous PET material (1.333 g/cc); and ρc is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET bottles, which are hot-filled at approximately 185° F. (85° C.), currently use heat setting to produce PET bottles having an overall crystallinity in the range of approximately 25% -35%.

Containers that are blow molded from various thermoplastics, such as polyethylene terephthalate, are used in the packaging industry to distribute food and beverages to consumers. To sterilize the internal product and ensure freshness, a process of hot-filling is used, which requires the product to be heated to temperatures from 180° F. to 205° F. prior to filling the container. After filling, the container is capped to integrally seal the container with a closure. After sealing the container begins to cool, which causes an internal vacuum to develop within the container.

Various methods have been devised to address the internal container vacuum created by the hot fill process, such as vacuum panels, nitrogen dosing, compressible ribs and the like. One such method of controlling vacuum is by creating container base designs that move inward to reduce the internal container volume thereby lowering internal vacuum. Such base designs can be passive or active. A passive base design allows the internal force of the vacuum to create the inward movement of the base panel. Active base designs require the use of an external mechanical force to reposition or invert the base inwardly. Examples of passive and active base designs can be found in the following U.S. patent documents, each of which is assigned to Amcor and is incorporated herein by reference: U.S. Pat. No. 6,942,116 titled "Container Base Structure Responsive to Vacuum Related Forces," and issued on Sep. 13, 2005; U.S. application Ser. No. 15/350,558 filed on Nov. 14, 2016 (Publication No. 2017-0096249 published on Apr. 6, 2017) titled "Lightweight Container Base;" and U.S. application Ser. No. 15/505,525 filed on Feb. 21, 2017 titled "Container Base Including Hemispherical Actuating Diaphragm."

With current hot-fill methods, the base is inverted after the container has been filled, capped, and cooled. The repositioning of the base can occur, for example, in a labeling machine at the same time an external label is applied to the container, or at a dedicated station after the container has been sufficiently cooled to about 98° F. or less. While current hot-fill methods are suitable for their intended use, they are subject to improvement. The present teachings advantageously provide for improved hot-fill filling methods that provides numerous advantages, such as those described herein and as one skilled in the art will recognize.

SUMMARY

This section provides a general summary of the disclosure, and is not a comprehensive disclosure of its full scope or all of its features.

A method for hot-filling a polymeric container with heated product. The method includes mechanically inverting a base of the polymeric container prior to the heated product cooling in order to create a positive pressure within the container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 4:
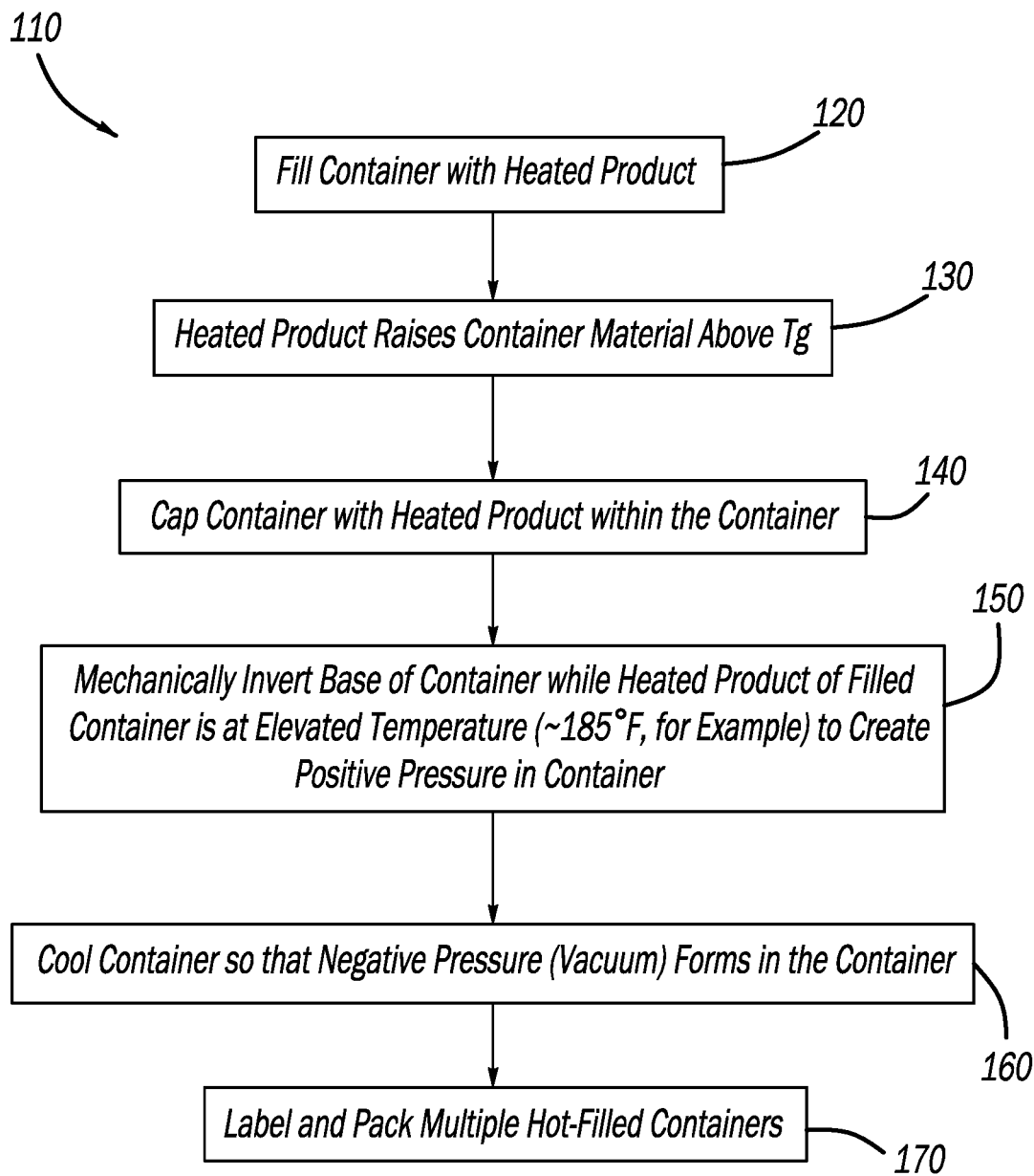
Figure 5:
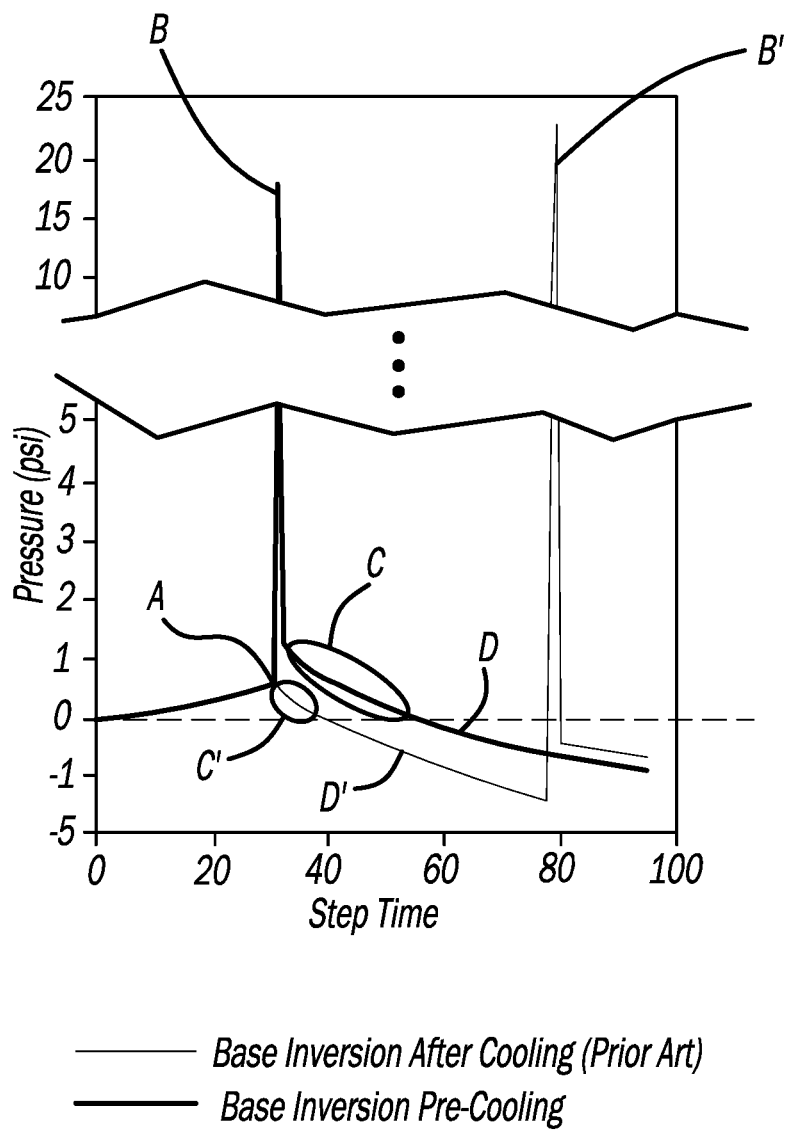

FIG. 4 illustrates a method in accordance with the present teachings for inverting a container base of a container hot-filled with product prior to the product cooling so as to create positive pressure in the container; and FIG. 5 illustrates pressure response of a container filled in accordance with the present teachings whereby a base of the container is inverted prior to cooling of a hot-fill product, as compared to pressure response of a container filled in accordance with a prior art method whereby a base of the container is inverted only after the hot-fill product is cooled.

Corresponding reference numerals indicate corresponding parts throughout the several views of the drawings.

DETAILED DESCRIPTION

Example embodiments will now be described more fully with reference to the accompanying drawings.

Figure 1:
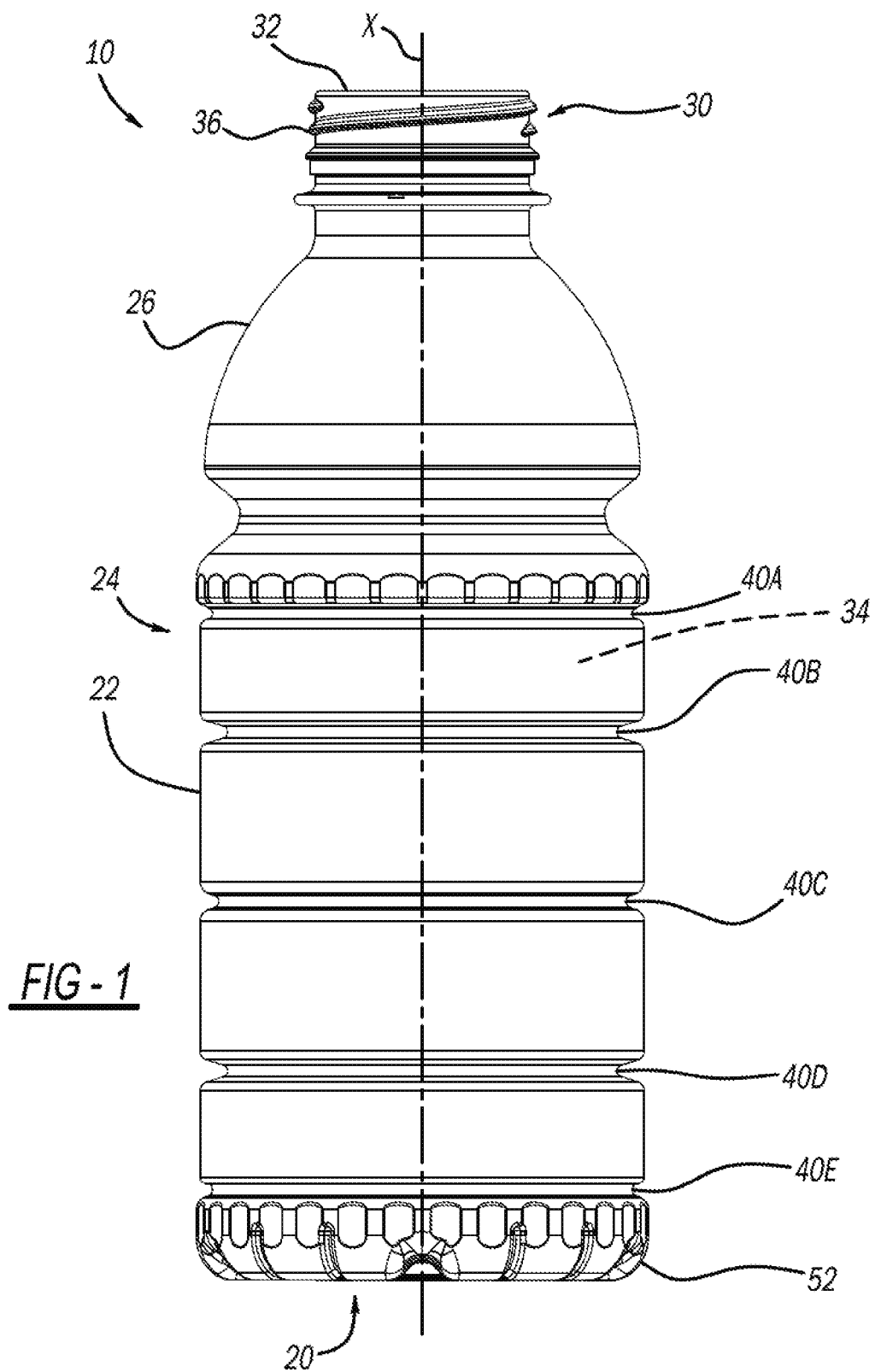
FIG. 1 illustrates a polymeric container fillable in accordance with the present teachings.

With initial reference to FIG. 1, an exemplary container that can be hot-filled in accordance with the present teachings is illustrated at reference numeral 10. The container 10 can have any suitable shape (such as round, oval, rectangular, square, triangular, pentagonal, hexagonal, octagonal, or polygonal) and any size (such as any suitable size between 10 ounces and 128 ounces). The container 10 can be hot-filled with any suitable product, such as any suitable beverage or food. Although the hot-fill method of the present teachings is described in conjunction with the container 10, any suitable container with an inversion base can be used. For example, the following documents, which are incorporated herein by reference, disclose exemplary containers that may be hot-filled in accordance with the present teachings: U.S. application Ser. No. 15/350,558 filed on Nov. 14, 2016 (Publication No. 2017-0096249 published on Apr. 6, 2017) titled "Lightweight Container Base;" and U.S. application Ser. No. 15/505,525 filed on Feb. 21, 2017 titled "Container Base Including Hemispherical Actuating Diaphragm."

FIG. 1 illustrates the container 10 in an as-blown, pre-filled configuration. The container 10 generally includes a base portion 20, which supports the container 10 upright on a flat surface. Extending from the base 20 is a sidewall 22 of a main body portion 24. The sidewall 22 extends to a shoulder portion 26. The shoulder portion 26 extends to a finish 30. The finish 30 defines an opening 32 to an interior volume 34 of the container 10. The interior volume 34 can be hot-filled with any suitable product. Extending outward from an exterior surface of the finish 30 are a plurality of threads 36, or any other suitable fastening feature, suitable for cooperating with a closure for closing the opening 32. In the example of FIG. 1, the main body 24 further includes sidewall ribs 40A, 40B, 40C, 40D, and 40E, which advantageously absorb vacuum forces within internal volume 34 of the container 10. The sidewall ribs 40A, 40B, 40C, 40D, and 40E are optional and thus need not be included in all applications.

The base 20 generally includes a heel 52 and a standing surface 56. As described herein, the base 20 is generally circular, but the base 20 may have any other suitable shape. For example, the base 20 may be oval, rectangular, square, triangular, pentagonal, hexagonal, octagonal, or polygonal.

Figure 2A:
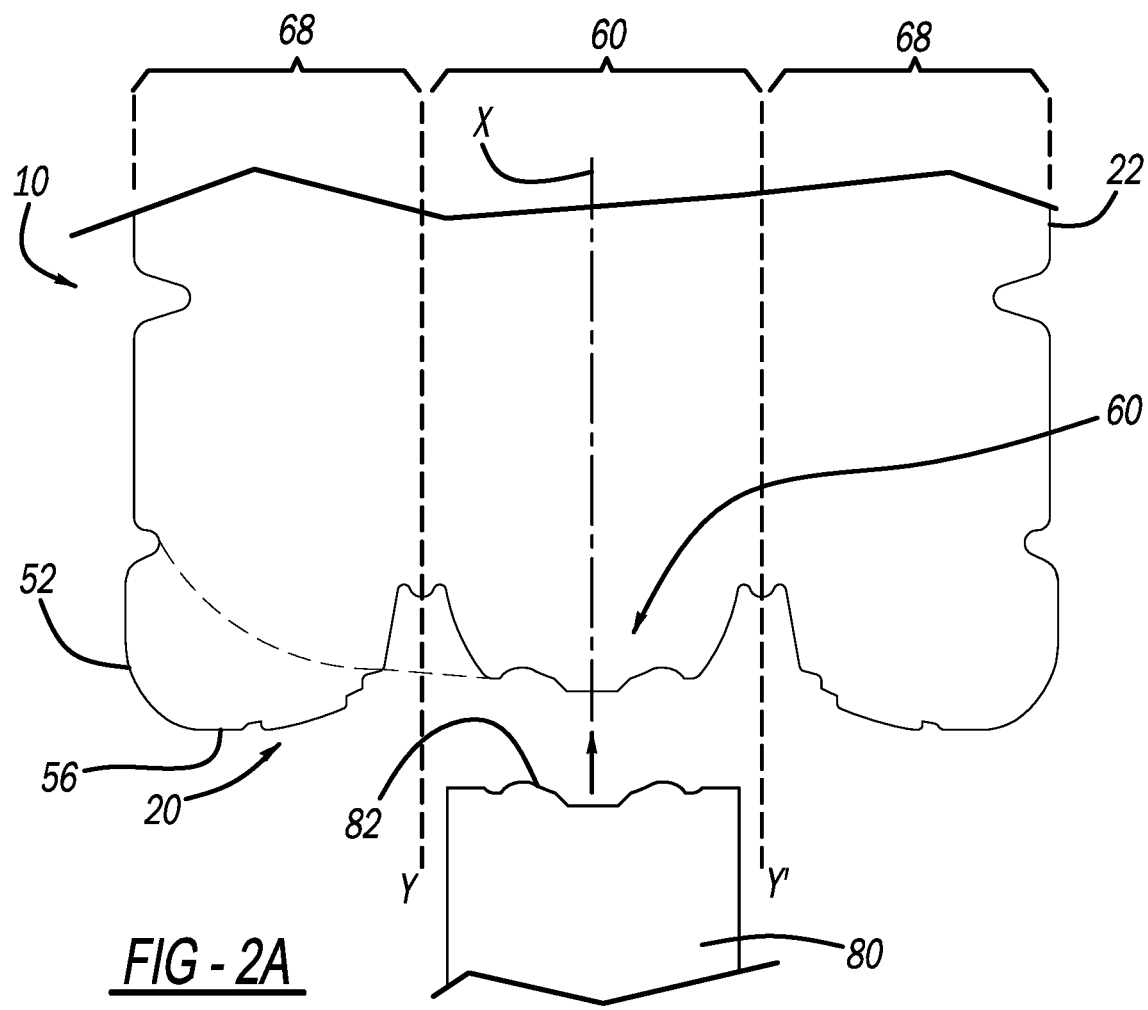
FIG. 2A is a cross-sectional view of a base of the container of FIG. 1 in a pre-fill configuration.
Figure 2B:
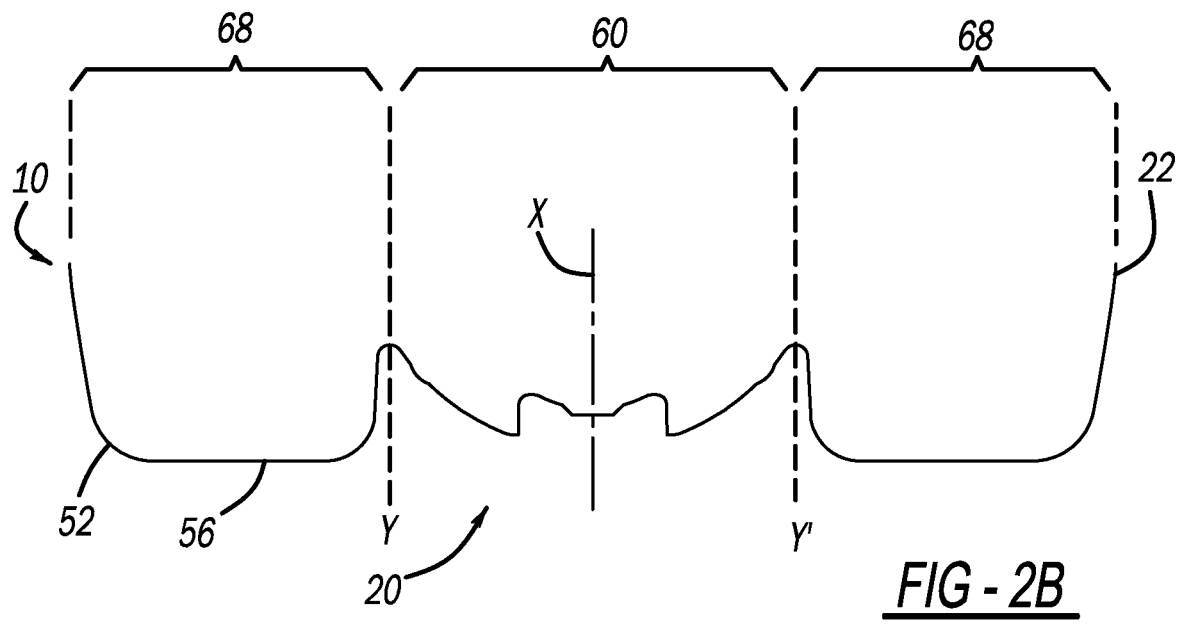
FIG. 2B is a cross-sectional view of another container base in accordance with the present teachings in a pre-fill configuration.
Figure 2C:
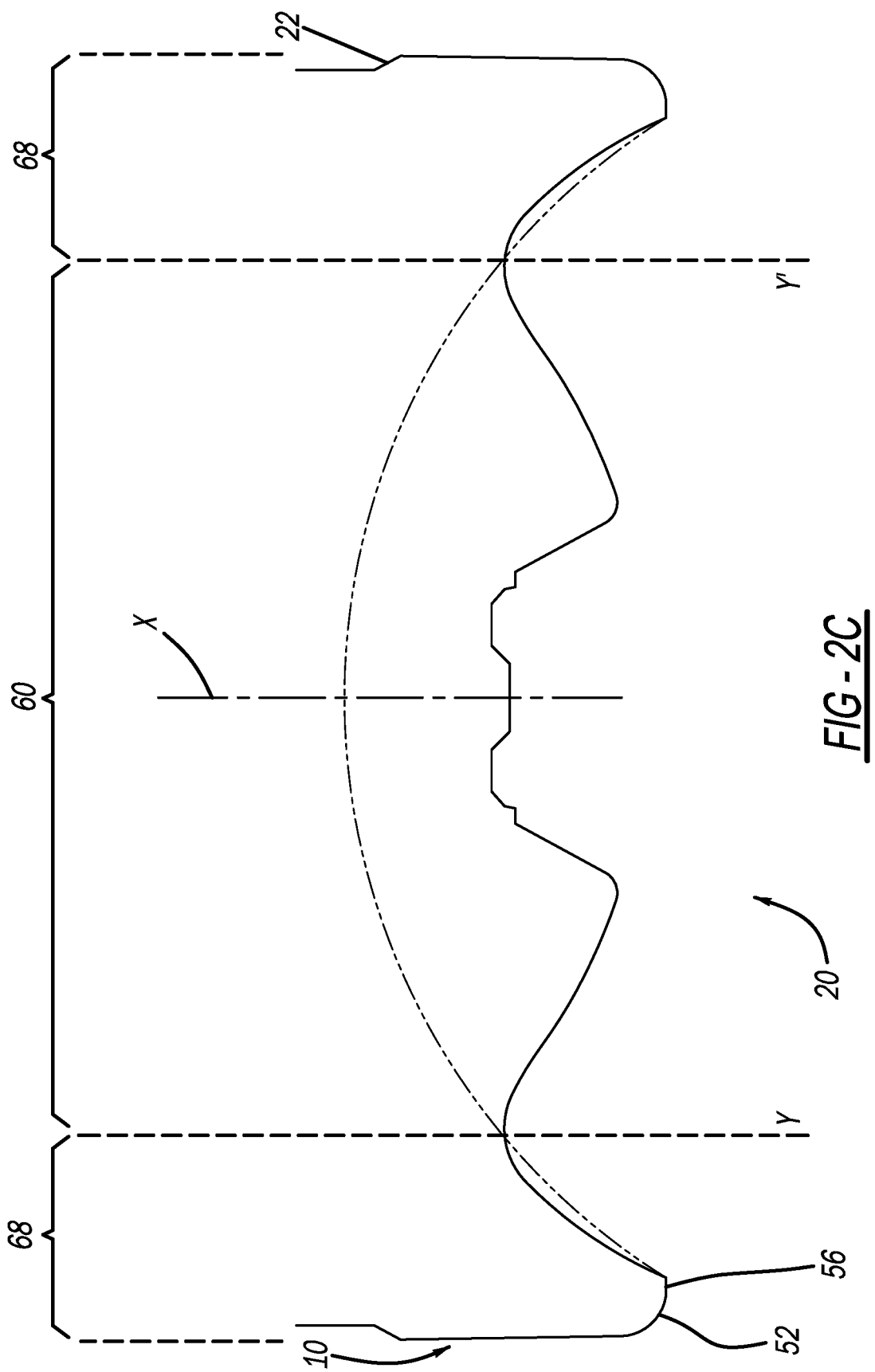
FIG. 2C is a cross-sectional view of an additional container base in accordance with the present teachings in a pre-fill configuration.

With continued reference to FIG. 1, and additional reference to FIG. 2A, additional features of the base 20 will now be described. FIGS. 2B and 2C illustrate additional bases 20 in accordance with the present teachings. FIGS. 2A, 2B, and 2C illustrate bases 20 in as-blown, pre-filled configurations.

The standing surface 56 surrounds a center pushup portion 60 of the base 20. The heal 52 and standing surface 56 together form fixed portion 68. Fixed portion 68 transitions to pushup portion 60 at an area defined by lines Y and Y'. The pushup portion 60 and the fixed portion 68, as well as the as-blown base 20 in general, can be formed in any suitable manner, such as in accordance with the teachings of U.S. Pat. No. 8,313,686 issued on Nov. 20, 2012 titled "Flex Ring Base" and assigned to Amcor Limited.

Figure 3A:
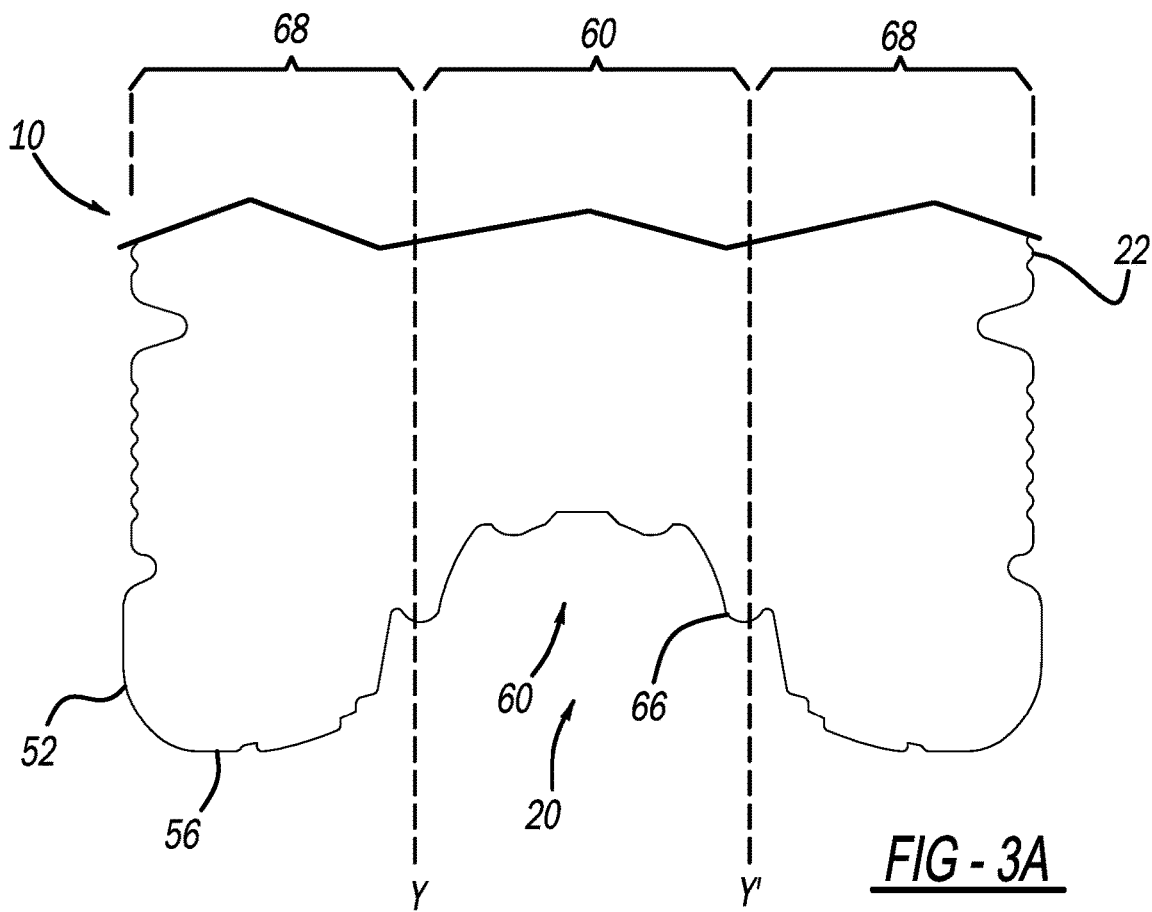
FIG. 3A is a cross-sectional view of the base of the container of FIG. 1 in an inverted, post-fill configuration.
Figure 3B:
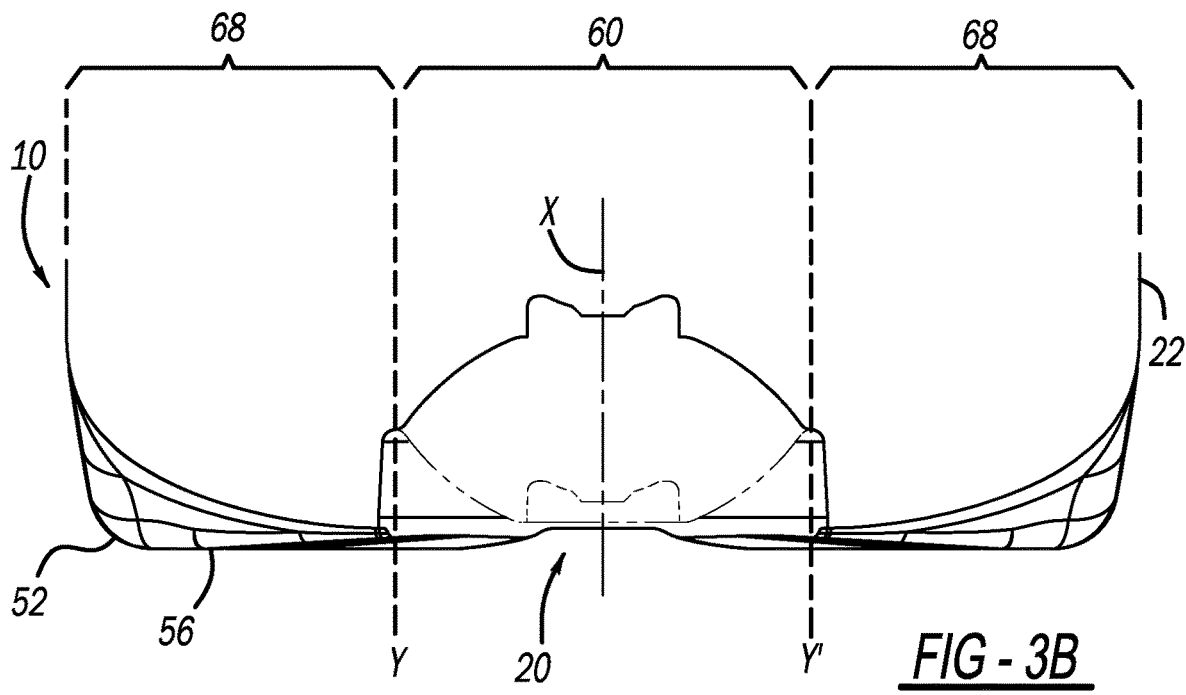
FIG. 3B is a cross-sectional view of the container base of FIG. 2B in an inverted, post-fill configuration.
Figure 3C:
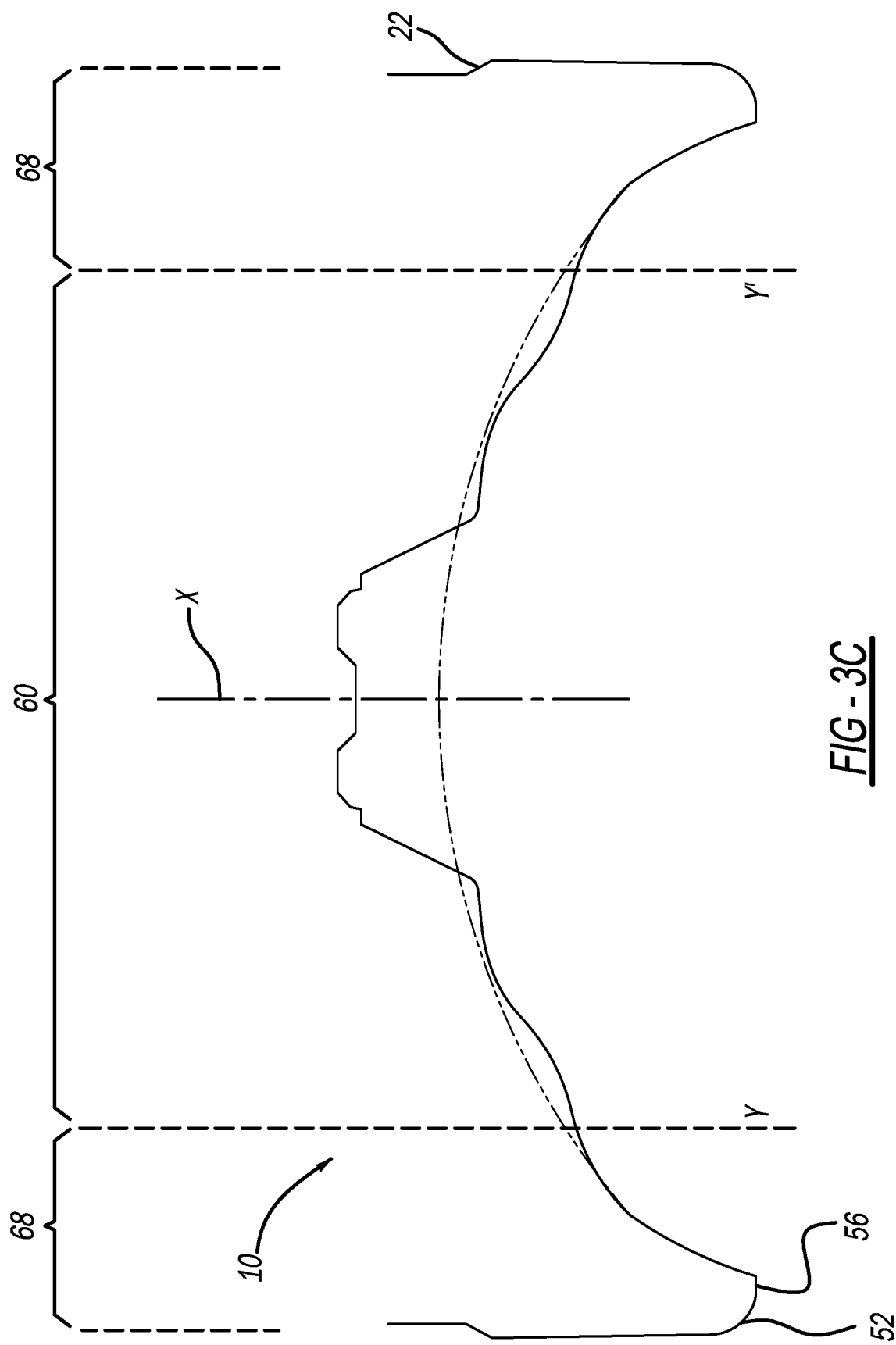
FIG. 3C is a cross-sectional view of the container base of FIG. 2C in an inverted, post-fill configuration.

After the container 10 has been hot-filled with any suitable hot fill product, and prior to the hot-fill product cooling, the pushup portion 60 is mechanically inverted by any suitable mechanical inversion device in accordance with the method 110 of the present teachings, which is described herein and illustrated in FIG. 5. For example and as illustrated in FIG. 2, an inversion rod 80 can be mechanically actuated upward in the direction of the arrow of FIG. 2 such that a contact surface 82 of the inversion rod 80 contacts the pushup portion 60 to push the pushup portion 60 inward and invert the pushup portion 60 to the inverted position of FIGS. 3A, 3B, 3C. The mechanical inversion can occur in a capping machine after the cap is applied, or in a dedicated station after capping and prior to a cooling operation.

Any suitable amount of inversion force can be applied to the base 20 to invert the base 20. For example, the inversion force can be 40 to 80 lbs. The material of the base 20 can have any suitable thickness, such as a thickness in the range of 0.010 inches to 0.020 inches. The inversion area of the base 20 can be less than 50% of a total projected surface area of the base 20. The base 20 can have a relatively wider range of base material weight, such as compared to containers filled by a process by which the base is inverted only after cooling, due to an increased flexural modulus of the base 20 at higher material temperatures, which allows for a relatively lower inversion force and higher reversion force after cooling.

FIG. 4 illustrates a method 110 in accordance with the present teachings for hot-filling a polymeric container with a heated product. The method 110 is described herein with reference to the exemplary container 10. However, the method 110 can be used to hot fill any other suitable container having a flexible base. Additional exemplary containers with flexible bases that can be hot filled using the method 110 are described in the following references, which are incorporated herein by reference: U.S. application Ser. No. 15/350,558 filed on Nov. 14, 2016 (Publication No. 2017-0096249 published on Apr. 6, 2017 ) titled "Lightweight Container Base;" and U.S. application Ser. No. 15/505,525 filed on Feb. 21, 2017 titled "Container Base Including Hemispherical Actuating Diaphragm." Any other suitable container with a flexible base can be hot-filled according to the method 110 as well.

With reference to block 120, the container 10 is first filled with any suitable heated product. The heated product can be any suitable beverage for food, for example. The product can be heated to any suitable temperature, such as any suitable temperature in the range of 165° F. to 205° F., such as about 185° F., which heats the material of container 10 to above the material glass transition temperature (Tg) at block 130. For example, the glass transition temperature of PET is typically in the range of 152° F. to 178° F. When the material of container 10 is above the glass transition temperature it becomes more flexible due to a decrease in the flexural modulus of the material. With reference to block 140, after the container 10 is hot filled, the container opening 32 of the container 10 is closed in any suitable manner, such as by securing any suitable closure (e.g., cap) to the finish 30, such as through cooperation between the closure and threads 36 of the finish 30.

After the container 10 has been closed (i.e., capped) at block 140, the method 110 proceeds to block 150. At block 150, the base 20 of the container 10 is mechanically inverted while the hot-filled product is still at an elevated temperature (i.e., before being allowed to cool) to create a positive pressure in the container 10. The container 10 can be mechanically inverted in any suitable manner, such as with the inversion rod 80 (or any other suitable inversion device) to move the base 20 from the as-blown position of FIGS. 2A, 2B, 2C to the inverted position of FIGS. 3A, 3B, 3C. This mechanical inversion is performed while the hot-fill product is still at the temperature at which the product was hot-filled, or at a temperature proximate to the temperature at which the product was hot-filled. For example, if the product was hot filled at a heated temperature within the range of 180° F. to 205° F., the mechanical inversion is performed while the product is still within the range of 180° F. to 205° F. If the product was hot filled at 185° F., the mechanical inversion is performed while the product is still at 185° F., or about 185° F. The mechanical inversion may also be performed prior to the base 20 cooling to a temperature below the glass transition temperature of the container 10 material, such as 152° F. to 178° F. for PET.

After the base 20 has been mechanically inverted at block 150, the method 110 proceeds to block 160. At block 160 the container 10 and the product therein are cooled, which results in a negative pressure (vacuum) being formed within the container 10. The container 10 and product can be cooled in any suitable manner, such as by passing the container 10 through a cooling tunnel, which sprays water on the container 10 to cool the container 10 and the product as the container 10 passes through the cooling tunnel. The container 10 and the product therein can be cooled to any suitable temperature, such as about 98° F. With reference to block 170, after the container 10 is cooled at block 160, the container 10 can optionally be labeled and packed together with a plurality of additional containers, such as additional containers hot-filled in accordance with the method 110.

FIG. 5 illustrates pressure response of an exemplary container 10 filled in accordance with the method 110 (see graph line for "Base Inversion Pre-Cooling"), as compared to pressure response when the exemplary container 10 is hot-filled according to a prior art method (see graph line for "Base Inversion After Cooling (Prior Art)") in which the base 20 is inverted only after the container 10 and the filled product has cooled. Pressure in the container 10 gradually increases from step time 0 to about step time 30 as a result of the container 10 being capped. At reference letter A, after the container 10 has been filled and capped in accordance with blocks 120 and 140 of method 110, the base 20 is mechanically inverted in accordance with block 150, which results in a pressure spike B. This pressure spike B creates a positive pressure within the container 10. The positive pressure continues, as illustrated at C, until about step time 50 or 55. Thus from about step time 30 when the base 20 is mechanically inverted at A, until about step time 55 at the end of period C, the container 10 has a positive pressure, which advantageously reduces the possibility of the container 10 being dented or damaged. After period C, the container 10 experiences negative pressure (vacuum) at D due to the container 10 being cooled, such as at block 160 of method 110.

In contrast to the example of the container 10 being filled according to the method 110 (see graph line of FIG. 5 for "Base Inversion Pre-Cooling"), when the container 10 is hot-filled by a prior art method in which the base 20 is inverted after cooling (see graph line for "Base Inversion After Cooling (Prior Art)"), subsequent to a step time of about 30 at reference letter A, the lack of mechanical inversion means that the positive pressure spike B will not occur, and instead the duration of positive pressure within the container 10 lasts for a relatively short period of time, designated in FIG. 5 at C'. At, or just prior to, step time 40, negative pressure (vacuum) is formed until nearly step time 80, see reference letter D'. Thus from about step time 40 to about step time 80 (designated at D') the container 10 hot-filled according to the prior art method is subject to being dented or otherwise damaged during conveying and handling. Positive pressure spike B' occurs at about step time 80 after the container 10 has been cooled, and the base 20 has been inverted, in accordance with any suitable prior art filling method. This positive pressure spike B' is very short lived, and the container 10 quickly returns to a negative pressure (vacuum) state.

The method 110 provides numerous advantages. For example, by inverting the base 20 before the hot-filled product cools, a positive pressure in the container 10 is created. The positive pressure reinforces the container 10 to prevent unwanted denting and possible damage as the container 10 is conveyed post-filling, such as through a cooling tunnel that sprays water on the container 10 to cool the container 10 as the container 10 passes through the tunnel. As the container 10 cools, the pressure within the container 10 decreases and transitions from a positive pressure when the container and product are hot, to a negative pressure (vacuum) when the container 10 is cooled. Thus inverting the container base 20 after hot filling and capping when the container 10 and product are still hot, such as at about 185° F., creates a positive pressure in the container 10, which advantageously reduces the possibility of the container 10 being dented or otherwise damaged during processing post hot fill. The cooled container 10 under final vacuum advantageously reduces spilling and overflow when the container 10 is opened by the consumer. This solves any problem of spilling when a container having a positive pressure inside is opened.

Inverting the base 20 while the container 10 and the hot-fill product are still hot, such as at a temperature of about 185° F., advantageously requires less inversion force due to the polymeric material of the container 10 being relatively softer as compared to when the container 10 is cool. Once the container 10 and hot-fill product have cooled, a relatively greater amount of force is required to revert the base 20 because the base 20 will have increased in stiffness when cooled, which advantageously helps maintain integrity of the container 10 during palletizing, shipping, or dropping.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for hot-filling a polymeric container made of a container material with heated product comprising:
   hot-filling the container with the heated product, during the hot-filling the heated product heats the container above a glass transition temperature;
   capping the container after the container has been hot-filled with the heated product by screwing a cap onto a threaded finish of the container;
   after the container has been hot-filled and capped, mechanically inverting with a mechanically adjusted pusher a center inversion area of a base of the polymeric container from a convex configuration to a concave configuration to create a positive pressure within the container prior to the container cooling below the glass transition temperature of the container material to create a positive pressure within the container, the center push-up portion is adjacent to, and surrounded by, a fixed portion of the base that remains stationary during mechanical inversion of the center push-up portion, the fixed portion includes a heel and a standing surface extending inward from the heel to the center inversion area, the center inversion area of the base is inward of the standing surface in both the convex configuration and the concave configuration; and
   cooling the container below the glass transition temperature in a cooling tunnel subsequent to mechanically inverting the base;
   wherein the positive pressure reinforces the container during conveying and cooling of the container to decrease occurrences of denting as the container cools below the glass transition temperature.

2. The method of claim 1, wherein the container material is PET and the glass transition temperature is 152° F. to 178° F.

3. The method of claim 1, wherein the container is hot-filled with product heated to a temperature within the range of 165° F. to 205° F.

4. The method of claim 3, wherein the product is a beverage or food.

5. The method of claim 1, wherein the container is hot-filled with product heated to 185° F.

6. The method of claim 1, wherein the base is mechanically inverted with a force within the range of 40 lbs. to 80 lbs.

7. The method of claim 6, wherein the base has a thickness within the range of 0.010" to 0.020".

8. The method of claim 1, further comprising, after mechanically inverting the base, cooling the container and the product to create a negative pressure vacuum within the container.

9. The method of claim 8, further comprising labeling and packing the container subsequent to cooling the container.

10. A method for hot-filling a polymeric container made of a container material with heated product comprising:
   hot-filling the polymeric container with the heated product;
   heating the container material above a glass transition temperature, during the hot-filling the heated product heats the container above the glass transition temperature;
   capping the polymeric container after the container has been hot-filled by screwing a cap onto a threaded finish of the container;
   mechanically inverting with a mechanically adjusted pusher a center inversion area of a base of the polymeric container from a convex configuration to a concave configuration prior to the container cooling below the glass transition temperature to create a positive pressure within the container that reinforces the container, the center push-up portion is adjacent to, and surrounded by, a fixed portion of the base that remains stationary during mechanical inversion of the center push-up portion, the fixed portion includes a heel and a standing surface extending inward from the heel to the center push-up portion, the center inversion area of the base is inward of the standing surface in both the convex configuration and the concave configuration; and
   subsequent to mechanically inverting the base, cooling the container below the glass transition temperature in a cooling tunnel to create a negative pressure vacuum within the container;
   wherein the positive pressure reinforces the container during conveying and cooling of the container to decrease occurrences of denting as the container cools below the glass transition temperature.

11. The method of claim 10, wherein the container material is PET and the glass transition temperature is 152° F. to 178° F.

12. The method of claim 10, wherein the container is hot-filled with product heated to 185° F.

13. The method of claim 10, wherein the base is mechanically inverted with a force of 40 lbs. to 80 lbs.

14. The method of claim 13, wherein the base has a thickness of from 0.010" to 0.020".

15. The method of claim 10, further comprising labeling and packing the container subsequent to cooling the container.

* * * * *